United States Patent
Chamings et al.

(10) Patent No.: US 6,400,145 B1
(45) Date of Patent: Jun. 4, 2002

(54) SEAT BELT TENSION SENSOR, METHODS OF INTEGRATION AND ATTACHMENT

(75) Inventors: Antony W. Chamings, Oxford; John O'Neill, Clarkston; Rudi Grzic, Sterling Heights, all of MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 44 days.

(21) Appl. No.: 09/597,042

(22) Filed: Jun. 20, 2000

Related U.S. Application Data

(60) Provisional application No. 60/202,162, filed on May 4, 2000.

(51) Int. Cl.[7] ............................................. G01B 07/14
(52) U.S. Cl. .................... 324/207.26; 24/633; 280/735; 324/207.11
(58) Field of Search ....................... 24/633; 224/207.11, 224/207.24; 280/801.1, 802, 804, 806, 735; 73/862.582, 465.9; 701/45; 324/207.26

(56) References Cited

U.S. PATENT DOCUMENTS

| | | | |
|---|---|---|---|
| 5,060,977 A | * 10/1991 | Saito | 280/802 |
| 5,960,523 A | * 10/1999 | Husby et al. | 24/633 |
| 5,996,421 A | 12/1999 | Husby | |
| 6,079,744 A | 6/2000 | Husby et al. | |
| 6,081,759 A | 6/2000 | Husby et al. | |
| 6,336,371 B1 | * 1/2002 | O'Boyle | 73/865.9 |

* cited by examiner

Primary Examiner—Michael J. Sherry
Assistant Examiner—Paresh Patel
(74) Attorney, Agent, or Firm—Markell Seitzman

(57) ABSTRACT

A force sensor (50, 50', 50a) generates a signal indicating the usage of a seat belt. A cylindrical housing (70, 70') has a wall (72) and a bottom (74) which define an internal cavity (124). The bottom has an opening (76) through it. A cable anchor (90) is slidably received within the cavity and is connected to a cable (54). The cable has one end secured to the cable anchor and another end connected to an anchor point. A magnet (120) is connected to a top of the cable anchor and is movable with the cable anchor. The cable anchor is biased to resist motion of the cable anchor toward the bottom of the housing. A magnetic sensor (200) for generates a signal indicative of the distance between it and the magnet. A sensor housing (180) is connected to the housing and is positioned on the housing to position the magnetic sensor a determinable distance from the magnet at a null position. A housing end cap (150) is secured to the housing for enclosing an open end of the housing. The magnet and the magnetic sensor are movable when a force of a determinable level is applied to the end cap causing the relative movement of the magnet and the magnetic sensor.

5 Claims, 8 Drawing Sheets

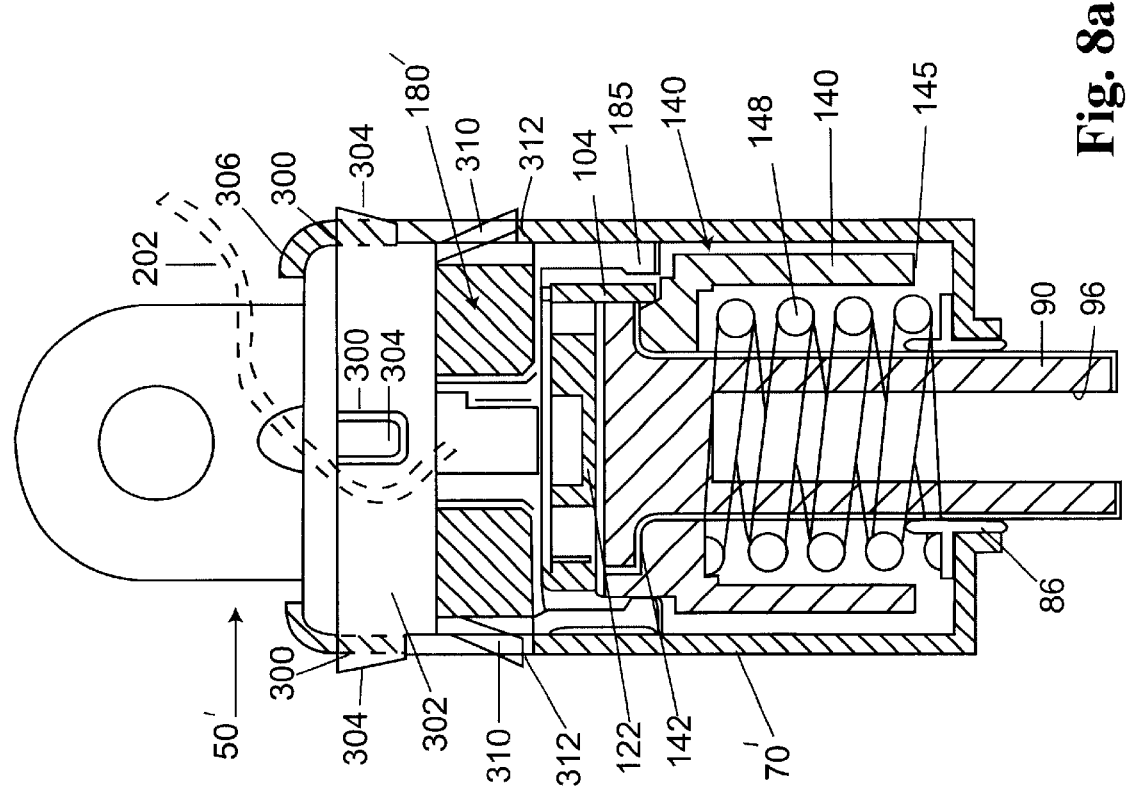
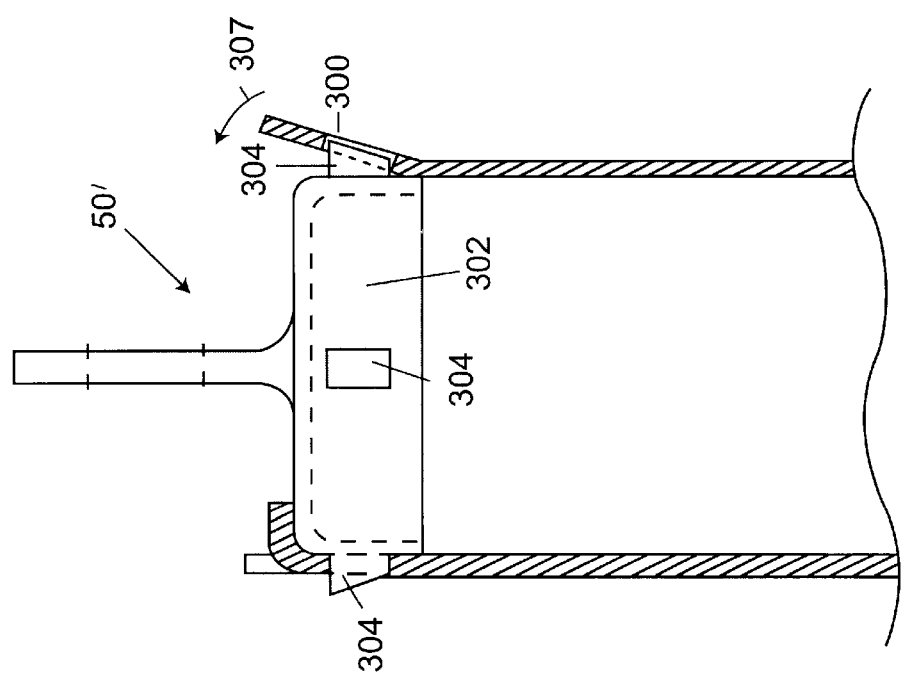
Fig. 8a
Fig. 8b

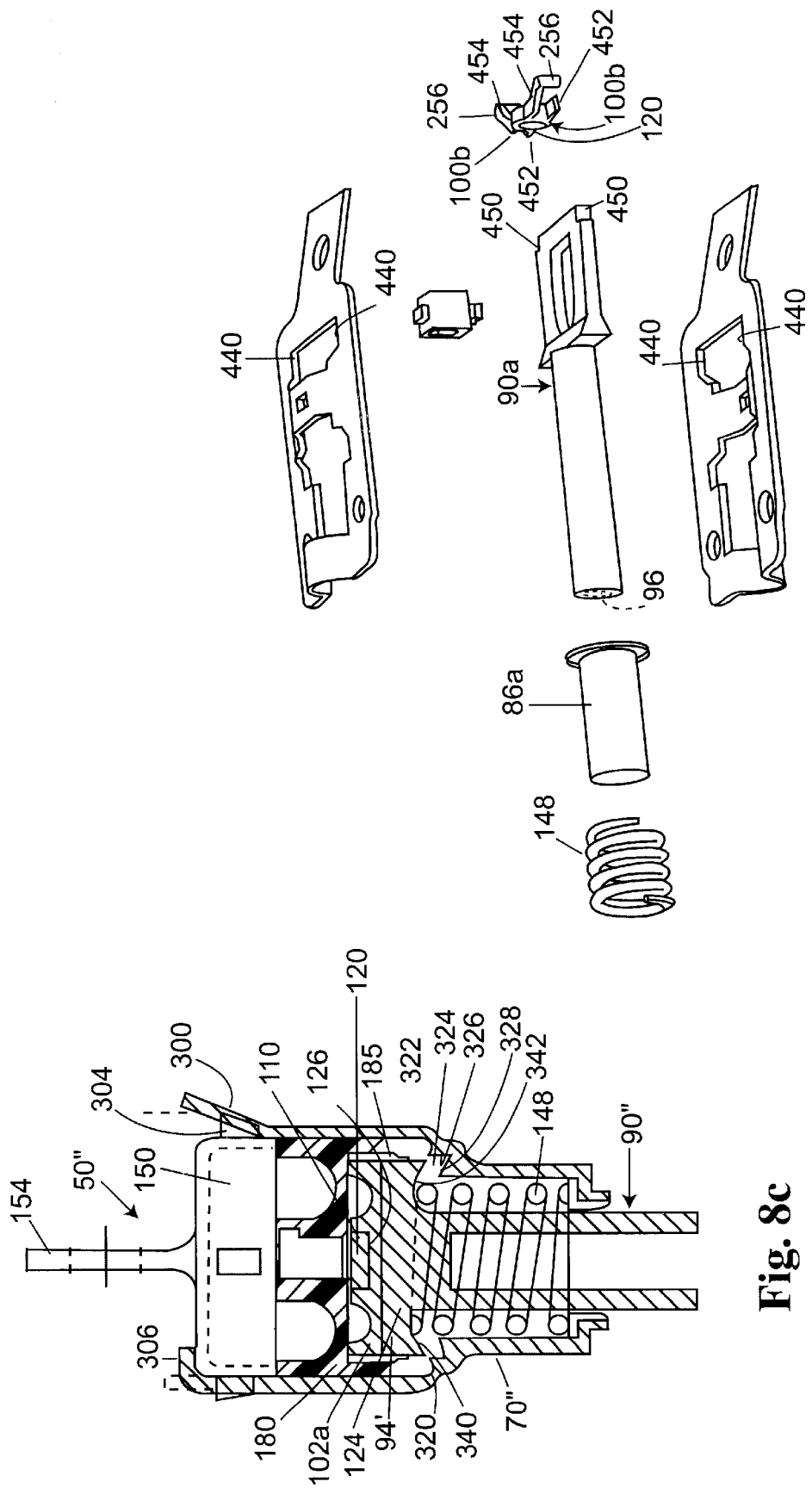

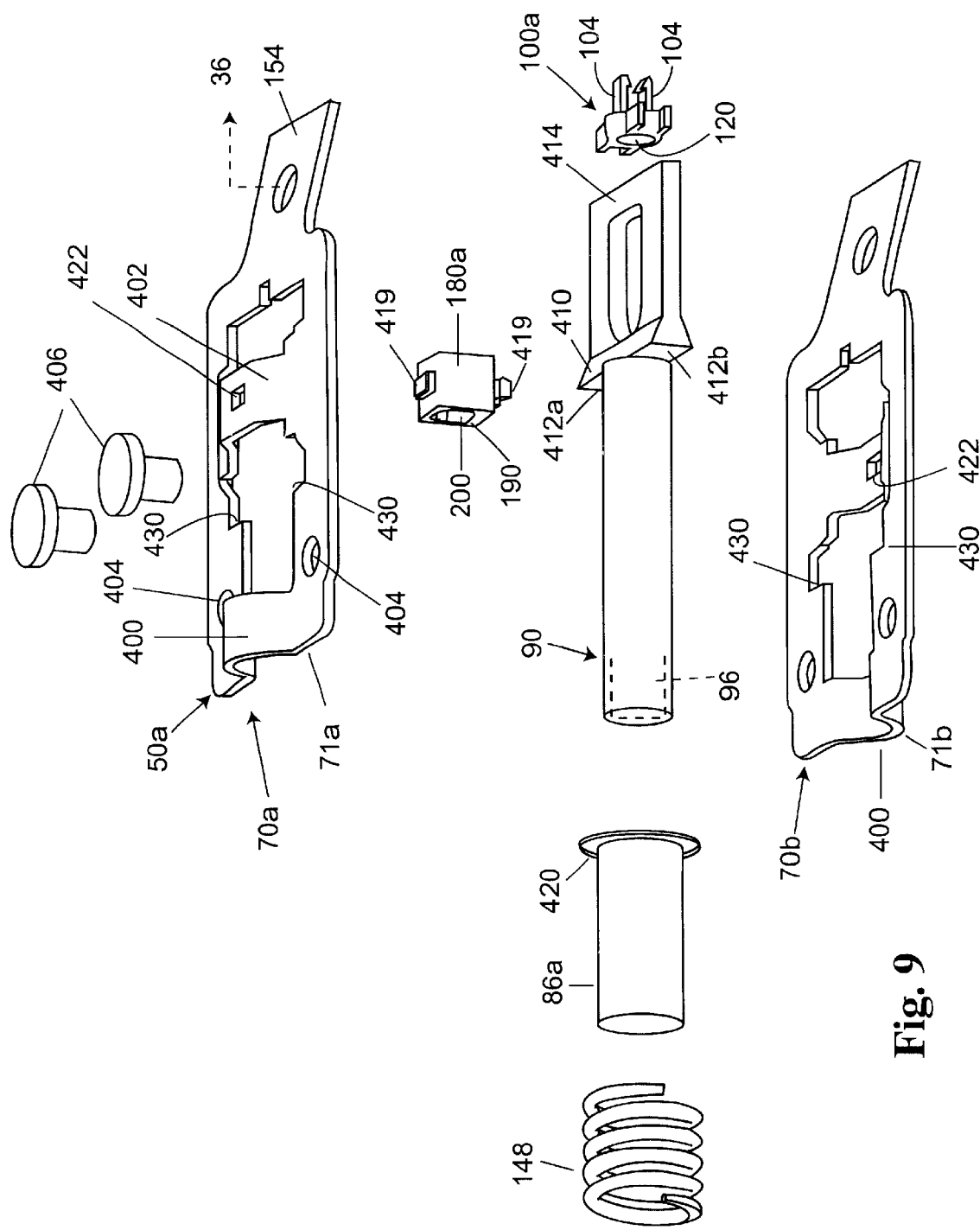

SEAT BELT TENSION SENSOR, METHODS OF INTEGRATION AND ATTACHMENT

This is a regularly filed utility patent application claiming priority of provisional patent application 60/202,162, filed May 4, 2000.

BACKGROUND AND SUMMARY OF THE INVENTION

The invention generally relates to safety restraint systems and more particularly to a sensor that is capable of measuring a force or tension in a component of a seat belt system, generally between the anchor point and the seat belt buckle.

In order to comply with government-mandated and market-driven injury reduction measures relating to the undesirable deployment of vehicle safety restraints in general and air bag restraint systems in particular, it is often desirable to determine the weight of the occupant in the front passenger seat. The weight of the front seat occupant is an important criterion to determine their ability to withstand an air bag deployment and is also a variable that can be used in setting which level of a multi-level air bag inflator should be used. Seat-based weight sensors have been developed to measure the occupant's weight. However, these weight sensors suffer from a deficiency related to the imposition of additional force in a downward direction onto the seat that can be imparted by a cinched or tightly fitting seat belt. This deficiency is particularly problematic with a belt tightly enveloping a child restraint (such as a child seat) into the vehicle seat. In view of this added downward force the control system might mistakenly conclude that a small adult or large child is seated on the seat instead of a child seat causing an incorrect deployment decision to be made as the weight sensor only measures the total downward force on the seat.

A force (or tension) sensor with the ability of sensing the tension (force) in the belt system can be used to more accurately differentiate the type or size of occupant, child seat, etc. in the vehicle seat. Additionally, such a force or tension sensing mechanism can also be used, not as a supplement to determine occupant weight but as an indication that the seat belt is properly tightened about the occupant or, alternatively, tightened about a child safety seat.

The present invention allows the incorporation of a small displacement controlled by a spring force between the belt system and an anchor point. The measurement of the displacement change due to tension in the belt system is sensed by magnetic sensor or other means, thus providing a signal indicating the tension in the belt system.

The sensor further provides a separate load path, via a stop, so that the maximum belt load achieved during a crash event can be safely contained.

It is an object of the present invention to provide a seat belt tension or force sensor.

Accordingly the invention comprises a force sensor for generating a signal indicative of the usage of a seat belt comprising: a cylindrical first housing having a wall and a bottom, the bottom including an opening, the first housing including an internal cavity; a cable anchor slidably received within the cavity and adapted to be connected to a cable (54); the cable having one end secured to the cable anchor and another end operatively connected to an anchor point; a magnet operatively connected to a top of the cable anchor and movable with the cable anchor; first means for biasing the cable anchor to resist motion of the cable anchor toward the bottom of the housing; a magnetic sensor means for generating a signal indicative of the distance between it and a magnet; a sensor housing securably connected relative to the first housing and positioned upon the first housing to position the sensor means a determinable distance from the magnet at a null position; a housing end cap securable to the first housing for enclosing an open end of the first housing, the magnet and the sensor means being relatively movable when a force of a determinable level is applied to the end cap, thereby causing the relative movement of the magnet and the sensor means. Various other embodiments are shown.

Many other objects and purposes of the invention will be clear from the following detailed description of the drawings.

BRIEF DESCRIPTION OF THE DRAWINGS

In the drawings:

FIG. 8a illustrates an alternate embodiment of a force sensor having a cylindrical profile.

FIG. 8b shows a step in the assembly of the embodiment of FIG. 8.

FIG. 8c shows an alternate cylindrically shaped force sensor.

FIG. 9 is an assembly view showing a further alternate embodiment of the invention.

FIG. 13 shows a further embodiment of the invention.

DETAILED DESCRIPTION OF THE DRAWINGS

Figure 1:
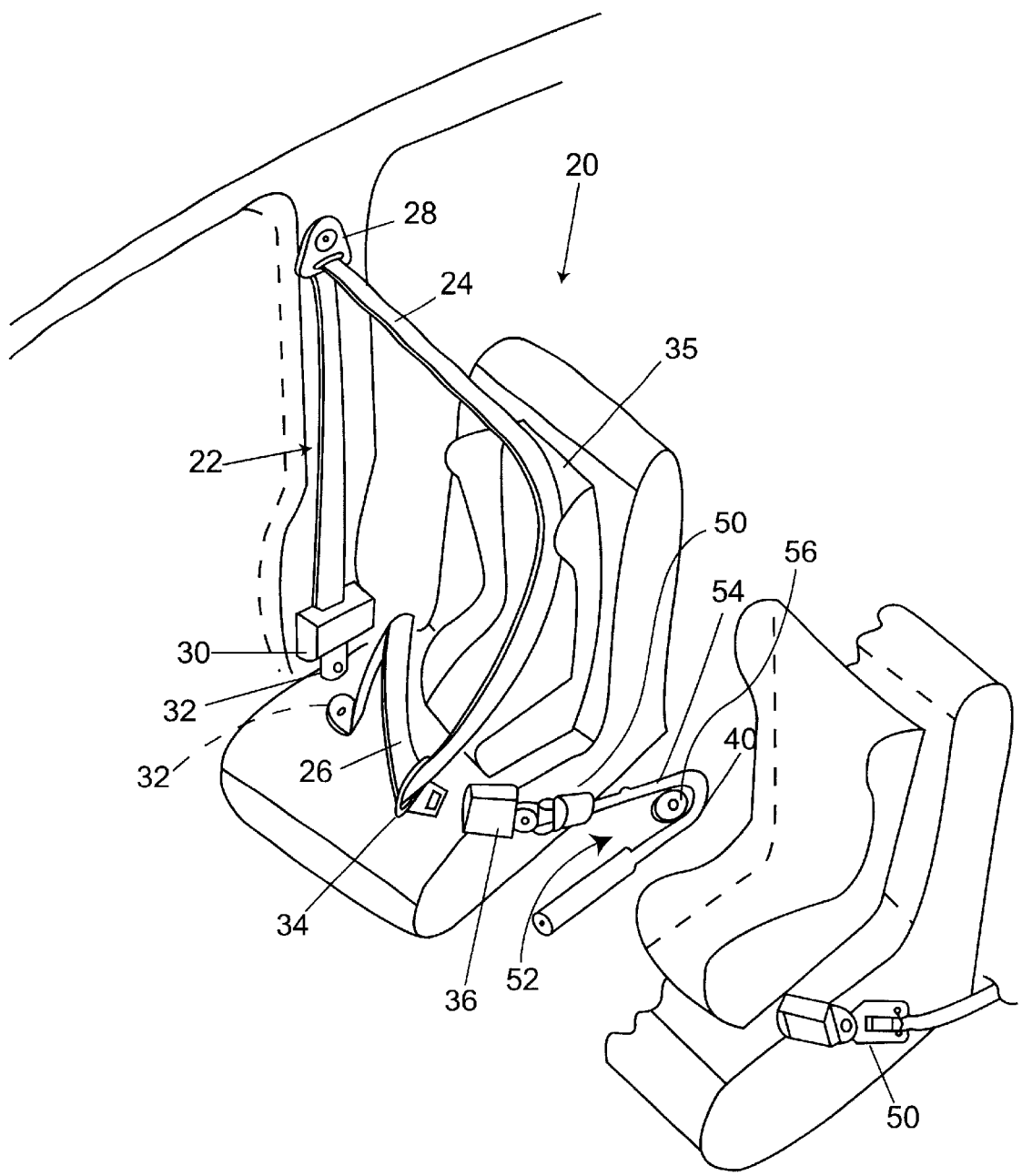
FIG. 1 shows a rudimentary three-point seat belt system.

Reference is briefly made to FIG. 1, which illustrates a three-point safety system 20 comprising a seat belt 22 divided into a shoulder belt portion 24 and lap belt portion 26. The shoulder belt is threaded through a D-ring 28 and received and rewound upon a spool of a retractor 30. The retractor is appropriately anchored as shown generally by numeral 32. The anchor can be the floor, the frame or the vehicle seat. The transition between the shoulder belt and the lap belt is defined by a tongue 34, which is inserted within a buckle 36. The buckle is secured to an anchor point 40, which would be the vehicle floor, vehicle frame, or vehicle seat. The end of the lap belt opposite the tongue is similarly anchored. FIG. 1 also shows a tension or force sensor of the present invention 50. The sensor 50 is attached either directly to an anchor point 40 or, for example, to the anchor point through a pretensioner (also referred to as a belt tightener) 52 through a cable 54. Depending upon the typical installation and design of the belt tightener, the cable 54 may be routed about a pulley 56. As is known in the art, the pretensioner will include a tubular housing in which one end of the cable is secured to a piston. As the piston is driven down the tubular housing by a selectively excitable charge of propellant, slack in the seat belt about the seated occupant is removed. As mentioned above, the pretensioner is an optional feature of the present invention.

Figure 2:
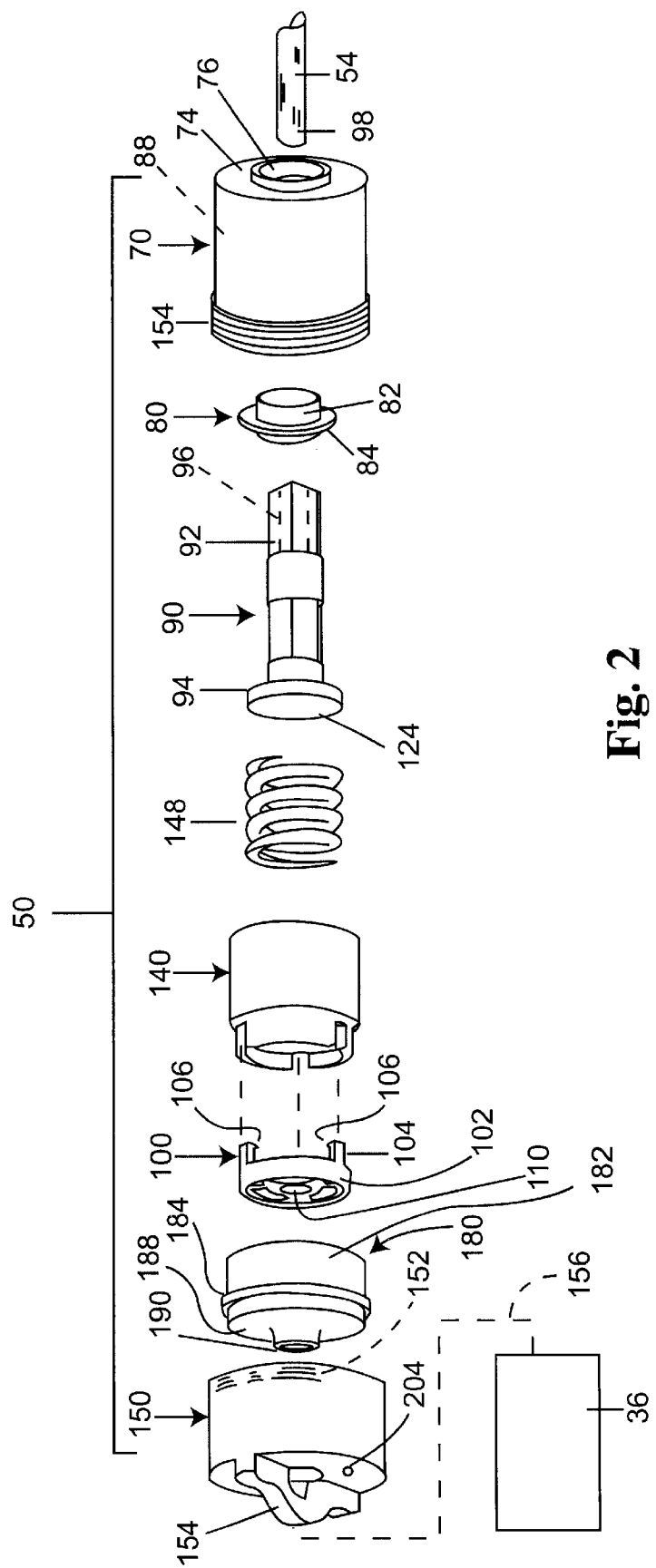
FIG. 2 is an assembly view showing many of the major components of the first embodiment of the invention.
Figure 3:
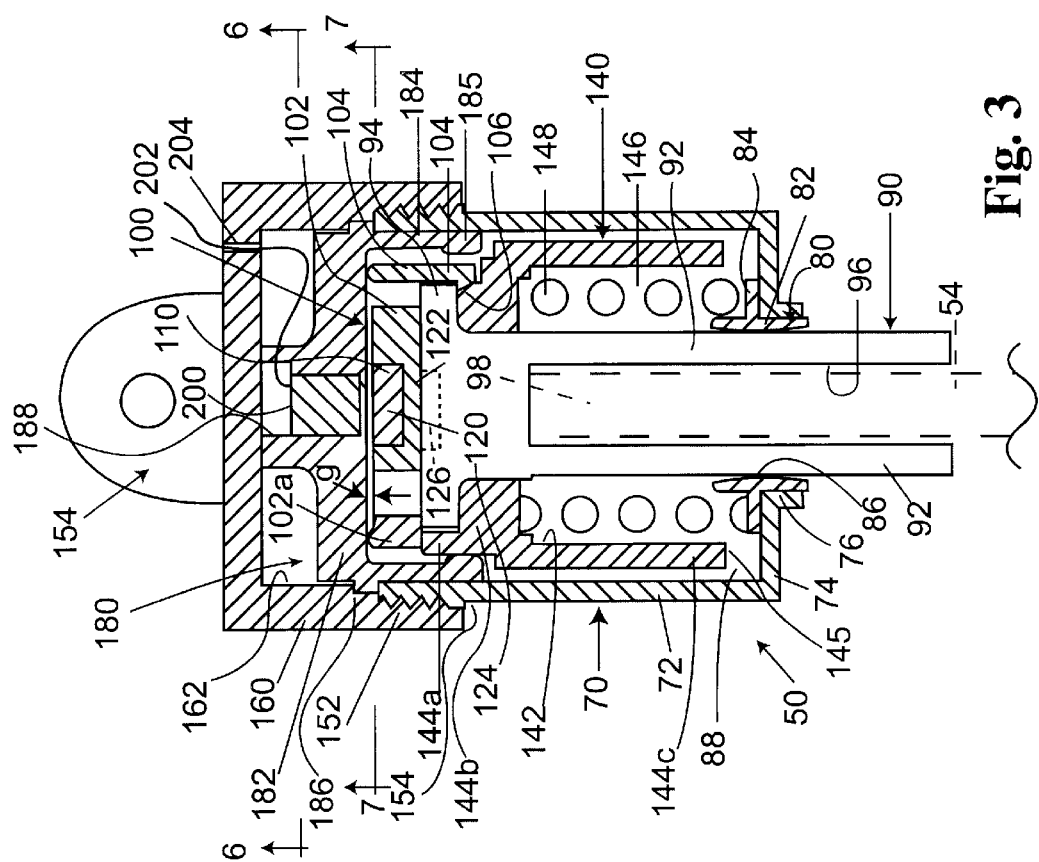
FIG. 3 is a cross-sectional view of a sensor through section 3—3 of FIG. 7. The force sensor is in a null or unforced condition.
Figure 5:
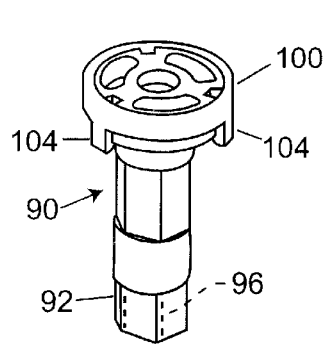
FIG. 5 is an isometric view showing the magnet retainer secured on a cable anchor.

With reference to FIGS. 2 and 3, it can be seen that the major elements of the present invention comprise a cylindrically shaped housing 70 having a cylindrical wall 72 and a bottom 74. The bottom 74 includes an opening 76. Inserted within the opening 76 is a bushing 80 having a hollow, generally cylindrical body 82 and a flange 84. As can be seen from FIG. 3, flange 84 sits on bottom 74 with the cylindrical portion 82 extending through the opening 76. As can also be seen more clearly in FIG. 3, the inner wall of the cylindrical portion 82 is arcuately shaped to provide an annular contact point (see numeral 86) to reduce sliding contact. The interior of the housing 70 defines a cavity 88. The bushing, and more particularly the curved portion 86, can be formed integrally as part of the bottom. The sensor 50 further includes a cable anchor 90, which includes a cylindrical body 92, which terminates at a wider flange 94. The anchor 90 includes a hollow bore 96 into which an end 98 of the cable 54 is received and secured such as by crimping. As can be appreciated, the cable 54 will be secured to the anchor 90 prior to installing the anchor within the sensor 50. Situated atop the anchor 90 is a magnet retainer 100. In the embodiment illustrated, the retainer 100 is a plastic part having a cylindrical body 102 with three flexible depending legs 104. Each of the legs 104 includes a clip fastener 106 to enable the retainer 100 to be snap fit about top of the cable anchor 90 (see FIGS. 3 and 5).

Figure 4:
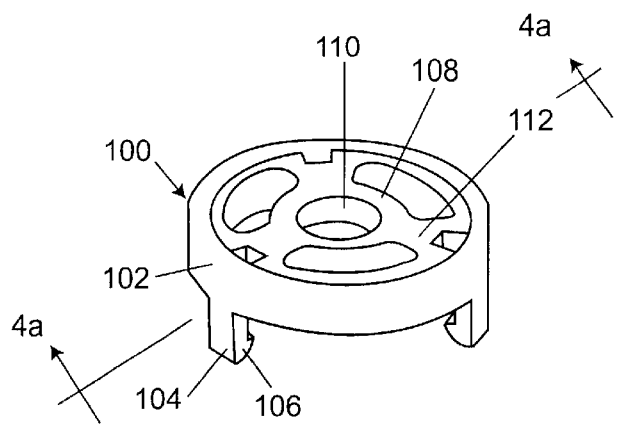
FIG. 4 is an isometric view of a magnet retainer.
Figure 4A:
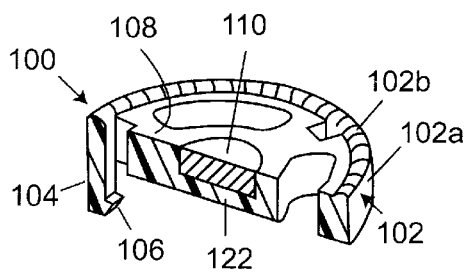
FIG. 4a is a cross-sectional view through section 4a—4a of FIG. 4.

As can be seen in FIGS. 4 and 4a, the magnet retainer includes a center hub 108 having a bore 110 and plurality of webs 110 securing the hub to the outer wall of the body 102. A magnet 120 is not shown in FIG. 4 but is shown in FIG. 4a and is secured to the retainer 100 at the bore 110. As can be seen in FIG. 3, the retainer 100 includes a web 122 at the bottom of bore 110 to provide a platform upon which the magnet can be properly fastened. The top 102b of the side wall 102a extends above the web 108 and the top of the magnet 122 and acts as a stop and defines a gap, g, with mating parts and also assists in setting the preload force of a bias spring. It should be appreciated that the retainer 100 properly locates the magnet relative to the end of the cable anchor 90, however, the magnet retainer can be integrally formed as part of end 124 of the anchor, such as by cold-forming a projecting boss, which would provide a platform that is similar in function to the web 122. Additionally, the anchor 90 can be formed with a recess (see the phantom line 126) into which the magnet can be placed. As can be appreciated, if the magnet retainer 100 is integrally formed at the end of the cable anchor 90, the length of the end 124 of the cable anchor would be appropriately lengthened (or the spring can be moved upwards making the sensor 50 smaller and lighter as well as eliminating two parts) such that the magnet is positioned at the location shown in FIG. 3.

The sensor 50 additionally includes a cylindrical piston 140. The piston 140 includes a step bore 142, which defines the preferred thickness of the walls of the piston. The piston 140 radially stabilizes the cable anchor relative to the longitudinal axis of the sensor 50 and prevents the anchor 90 from cocking, which would add friction and also improperly move the magnet relative to a magnetic sensor. As can be seen, the upper cylindrical wall 144a envelops the sides of the flange 94 to further stabilize the anchor. An intermediate wall 144b provides a step below the underside of the flange and reduces the size of the bore 142 such that it is closely spaced relative to the body 92 of the cable anchor 90 providing added support. The lower wall 144c is of the largest diameter and defines a spring-receiving cavity 146 for a compression spring 148. As can be seen, when the cable anchor 90 is pulled relatively downwardly by the cable 54, the spring 148 resists this motion and urges the piston 140 and hence the cable anchor 90 upwardly. As can be appreciated, the bottom 145 of the piston will act as a stop if the force sensor 50 (50') is subjected to very high separating forces such as may occur during the operation of the pretensioner 52.

The sensor 50 additionally includes a cap (or buckle anchor) 150 that is secured to the housing 70. As can be seen, the cap 150 is hollow and has threads 152, which mate with threads 154 formed on the housing 70. As can be appreciated, various other methods of attachment can be substituted. The cap 150 functions as a buckle anchor and includes a fastener or anchor 154 that is adapted to be secured, either directly or indirectly, such as through a cable (see phantom line 156 in FIG. 2), or a length of seat belt webbing to the buckle 36 or a rivet (not shown).

With reference to FIG. 3, it can be seen that the walls 160 of the cap also define a cavity 162. Fixedly positioned relative to the cap is a sensor retainer 180. FIG. 3b shows a partial cross-sectional view of the sensor retainer. The sensor retainer has a cylindrical body 182 with a cylindrical flange or sleeve 184 that is received within a cylindrical groove 186 formed on an interior wall of the cap 150. The sleeve or flange 184, on an interior wall, includes a circular projection 185, which is preferably semi-circular in cross-section to radially stabilize the piston relative to the axis of the sensor 50. The shape of the projection 185 provides for a point contact, further reducing friction. The projection can also be flat but preferably of a short dimension to keep friction low. In the illustrated embodiment the sensor retainer is sandwiched between the housing 70 and the cap 150. The top 188 of the sensor retainer includes a groove, passage, or bore 190 into which a magnetic sensor 200 is received. The magnetic sensor can be, for example, a Hall effect or variable reluctance sensor, or a magneto-restrictive sensor which provides a signal, the level of which varies in relationship to the relative distance between it (the magnetic sensor) and the magnet 120. Wires, such as 202, emanating from the sensor 200 can be communicated out from the force sensor 50 through an opening 204 in the cap. The wires are communicated to conditioning electronics or directly to a microprocessor. Sensors of the variety mentioned above can provide a variable signal indicative of the variable distance between the magnet 120 and the sensor or, alternatively, provide a digital output (on or off) indicative that a certain separation distance has been achieved as the force sensor 50 is loaded.

Figure 3A:
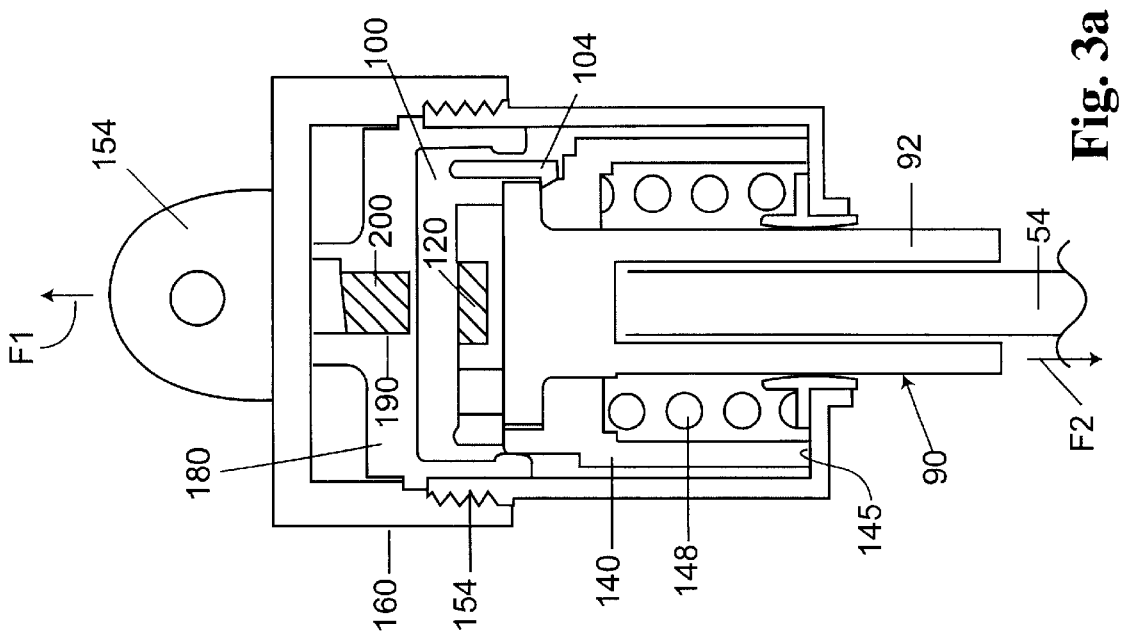
FIG. 3a shows the force sensor in a loaded condition.
Figure 3B:
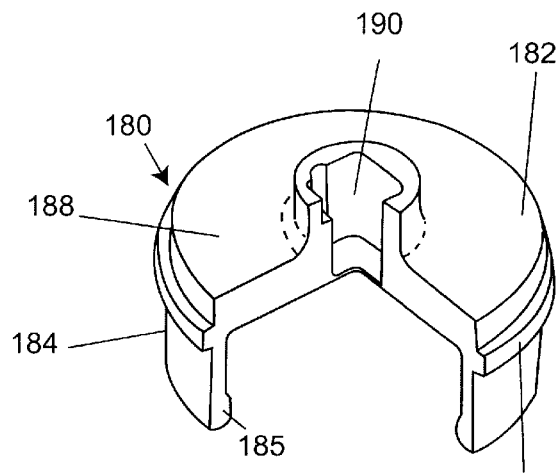
FIG. 3b is a partial cross-sectional view of a sensor housing also shown in FIG. 3.
Figure 6:
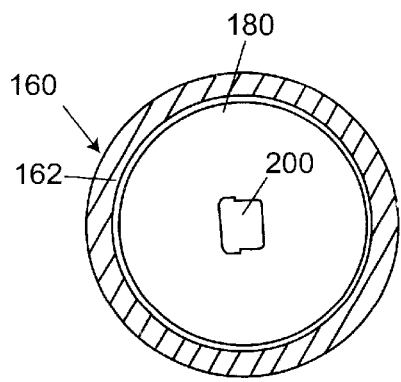
FIG. 6 is a cross-sectional view through section 6—6 of FIG. 3.
Figure 7:
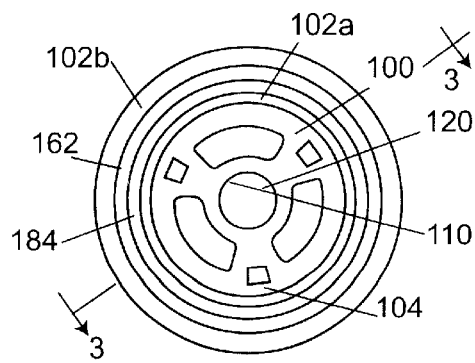
FIG. 7 is a cross-sectional view through section 7—7 of FIG. 3.

Reference is again made to FIG. 1, as well as FIG. 3a. As can be appreciated, when the tongue is latched into the buckle and when the lap belt is drawn tightly about the occupant, the tongue 34 will pull upwardly on the buckle. This action also urges the occupant onto the seat or urges a child seat 35 (see FIG. 1). As mentioned above (see FIG. 2), the buckle 36 is secured to the force sensor 50. This upward force (see arrow F1) will tend to move the force sensor 50 upwardly against the bias force of the spring. The reaction force acting through the anchor is shown by arrows F2. The applied forces will cause the spring to compress and, as such, move the magnet ever so slightly away (see FIG. 3a) from its rest position (shown in FIG. 3) relative to the magnet sensor 200. A sensor output differing from that which is generated at the rest position would indicate that the lap belt has been properly secured about the occupant and also indicate a measure of the downward force the seat belt system is applying to the seated occupant or buckled-up child seat.

Reference is briefly made to FIGS. 8a and 8b as well as to FIGS. 2 and 3. FIGS. 8a and 8b show an alternate force sensor 50', which utilizes many of the components previously described in relationship to FIGS. 2 and 3. As can be seen, the housing 70' of this force sensor is considerably longer than the housing 70 of FIG. 2. Additionally, the threaded connection between housing 70 and connector 150 has been removed. In this embodiment, the housing 70' includes a plurality of openings 300 disposed about its periphery near an upper end thereof. The walls 302 of the cap 150 include a plurality of engagement features 304, such as a triangularly shaped projection. The cap 150 is pushed within housing 70' such that the features 304 are received and locked within openings 300. Thereafter, end 306 of the housing 70' is bent or swaged over (see arrow 307) to retain the cap 150 in place. FIG. 8a also shows a similar variant with regard to how to secure the sensor retainer 150 in place. The sensor retainer 180' of FIG. 8a also includes a plurality of projections 310, each of which is received within a corresponding opening 312, also formed within the wall of housing 70'.

As mentioned earlier, the cable retainer can include provision to hold and retain the magnet 120. The cable retainer 90" includes a bore 110 to receive the magnet. Additionally, the top of the cable retainer 90" is formed in the shape of the top of the magnet retainer and includes an integrally formed, preferably annular wall 102a, which spaces the magnet properly relative to the sensor retainer 180". As can be seen, the housing 70" and the sensor retainer 180" do not include the openings 312 and projections 310 shown in FIG. 8a, which were used to hold the sensor retainer in place in the housing 70'. Instead, housing 70" is formed with an annular groove 320, which receives the complementary-shaped lower surface 322 of the cylindrical flange or sleeve 184. As can be appreciated, when the top of the housing 70" is bent over, it retains both the buckle retainer 50" and the sensor retainer 180. If this bent-over method of securing is sufficient, the projections 304 and openings 300 can be removed. The above-mentioned piston 140 is not used in this embodiment. As can be seen, the flange 94' of the cable retainer slides against the circular projection 185 (formed in an annulus). The housing 70', further includes an annular groove 324 with a cylindrical side wall 324 and an inner wall 328, which is angled upwardly to give the groove a sharp notch or V-like shape. The lower surface 340 includes an angled, peripheral wall 342 that is shaped to matingly engage with the inner wall 328. When the spring 148 is compressed and the wall 328 engages wall 342, the reaction forces are directed inwardly, which prevents the housing from buckling. As can be appreciated, the part count of this embodiment has been lowered, which should result in a lower cost and with the removal of the piston, the diameter of the sensor 50" can be made smaller than the earlier embodiments.

Figure 10:
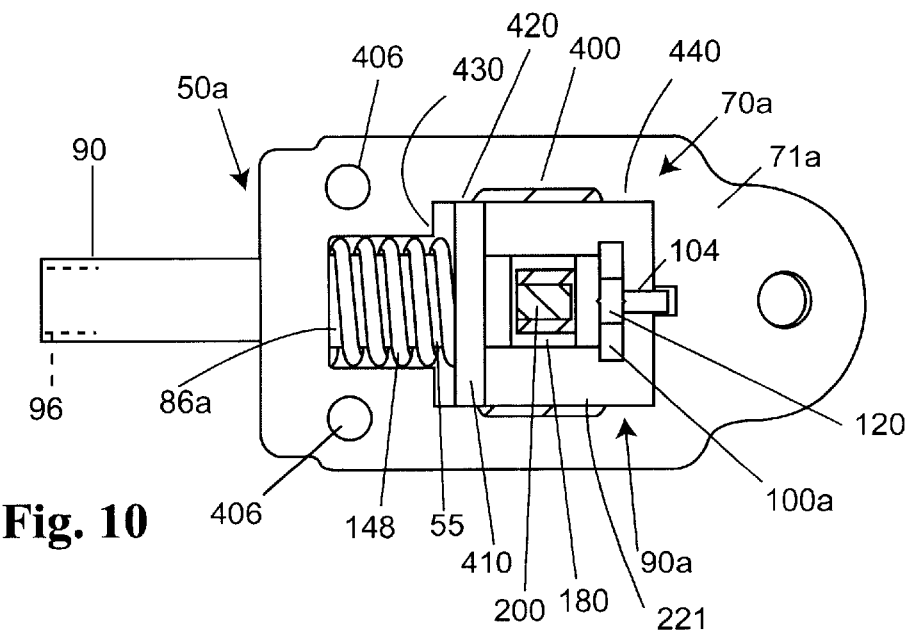
FIG. 10 shows an assembled sensor in a null condition.
Figure 11:
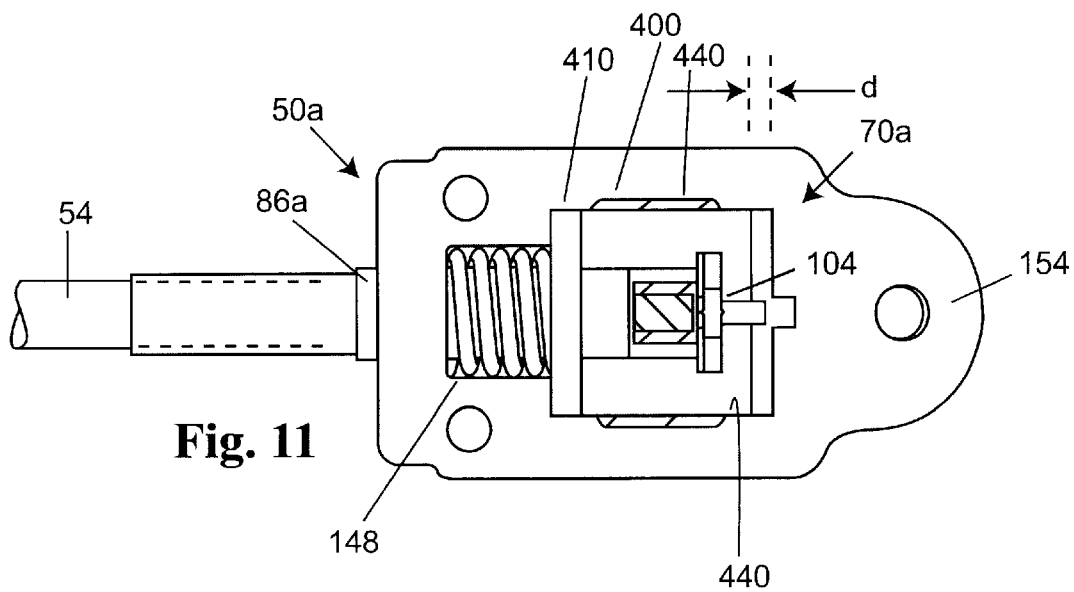
FIG. 11 shows the sensor in a force deflected, force sensing condition.

Reference is made to FIGS. 9–11, which show a further embodiment of a force sensor 50a. FIG. 10 shows the null position of the sensor and FIG. 11 shows the active state of the sensor with the magnet moved a distance, d, relative to the stationary sensor. The force sensor 50a includes a housing 70a having two parts 71a and 71b, which clamp together or fit together in a clam shell manner. Each of the housing parts 70a and 70b is preferably formed as a metal stamping, forging or casting. The housings include two upraised bridge portions 400 and 402. As can be appreciated, when the housing parts are mated together, the opposed bridge sections 400 and 402 provide a passageway for various moveable parts. Each of the housing portions includes a plurality of openings 404, which can be secured together by rivets 406 or other fastening mechanisms including welding. An end 55 of cable 54 is secured to a cable retainer 90a. As can be seen, the cable retainer is formed as a square annulus. The bottom 410 of the retainer is wider than the diameter of the cable 54. Portions 412a and 412b, which extend outwardly from the cable, function as a stop (as described below). The magnet 120 is received within a magnet retainer 100a, which includes flexible legs 104, which are clipped about the top or far end 414 of the cable retainer.

This force sensor 50a also includes a sensor retainer 180a into which a magnetic sensor 200 is received. As can be seen from FIG. 9, the sensor retainer 180a includes a plurality of integrally formed bosses 419, which are received within openings 422 formed in each of the bridges 402 (of the housing parts 71a and 71b). The cable 54 is received within a hollow sleeve, which functions as a bushing 86a. The bushing or sleeve 86a includes a flange 420. When in position, the flange 420 rests against the flange or stops 412a and 412b of the cable retainer. A spring 148 is fit about the bushing 86a and biases the cable anchor 90a into the housing 70a and resists the outward pulling motion of the cable 54.

Reference is again made to the housing parts 71a and 71b. Each housing part includes a pair of steps 430, which are sized to receive the extending portions 412a and 412b of the anchor 90a and, in combination with these portions, act as a stop (see FIG. 9) to prevent excessive outward motion of the cable. It should be noted that top bridge 400 in FIGS. 10 and 11 has been removed to show opposing walls 440, which guide the cable retainer 90a as it slides back and forth. The sensor retainer and sensor are also shown in cross-section in these figures.

Figure 12:
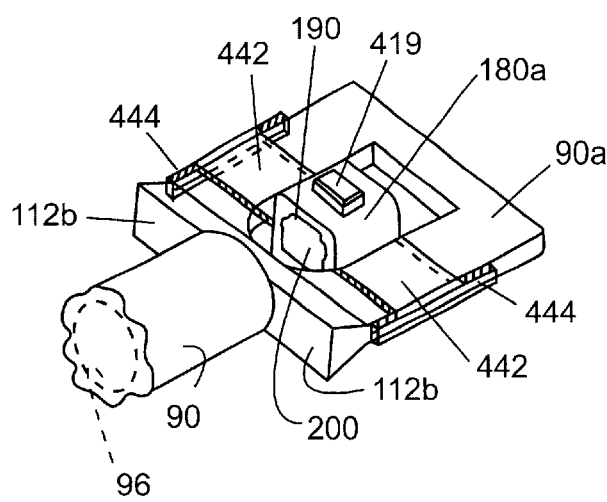
FIG. 12 shows another embodiment of a sensor retainer.

FIG. 12 shows a further embodiment of the sensor retainer 180a. In this embodiment the sensor retainer includes a pair of opposing wings 442. Each wing 442 includes a crosspiece 444, which extends perpendicularly relative to the wing 442. Each crosspiece 444 lies adjacent a corresponding side of the cable retainer 90a and provides a low friction interface with walls 440 of the frame. The crosspieces 442 are made of a material that is dissimilar to the frame. In the illustrated embodiment, the entire sensor retainer, including the crosspieces, is preferably plastic.

FIG. 13 shows still another variant of the invention and is very similar to the embodiment of FIG. 9. In this embodiment, the cable retainer 90a includes two notches 450 at its far end 414. The magnet retainer 100b is received against end 414 as in the earlier embodiment, however, retainer 100b includes a pair of lower wings 452, which are positioned on the undersurface of the sides of the cable retainer and a pair of upper wings 452 rest on the top surface of the cable retainer. The magnet retainer 100b is further secured to the cable retainer 90a with depending legs 256, which snap into a corresponding notch 250. The legs slide against the frame walls 440 to provide a low-friction interface. The legs 256, in combination with the sleeve or bushing 86*a*, provide a three-point mounting to prevent the cable retainer from cocking as it moves.

Many changes and modifications in the above-described embodiment of the invention can, of course, be carried out without departing from the scope thereof. Accordingly, that scope is intended to be limited only by the scope of the appended claims.

What is claimed is:

1. A force sensor (50*a*) for generating a signal indicative of the usage of a seat belt comprising:

a first housing (70*a*) having first and a second housing part, the first and second housing parts each including a first bridge portion (400) and a second bridge portion (402), the first bridge portions defining a first passage and the second bridge portions defining a second passage;

a cable anchor (90) slidably received within the first and second passages formed by the bridge portions, the cable anchor adapted to be connected to a cable (54), the cable anchor, at a first anchor end, includes an annular portion (44);

the cable (54) having a first cable end operatively secured to a second anchor end and a second cable end operatively connected to an anchor point;

a magnet (120) operatively connected to annular portion of the cable anchor and movable with the cable anchor;

first means for biasing the cable anchor to resist motion of the cable anchor toward an end of the first housing opposite the location of the magnet;

a sensor housing (180) fixedly positioned between the second bridge portions and located within the second passage, the annular portion of the cable anchor surrounding the sensor housing;

a magnetic sensor (200), located within the sensor housing for generating a signal indicative of the distance between it and the magnet, such distance proportional to a force applied to the seat belt;

the magnet and the magnetic sensor being relatively movable when a force of a determinable level is applied to the end cap thereby causing the relative movement of the magnet and the magnetic sensor.

2. The sensor as defined in claim 1 wherein at least one housing part includes a stop for interacting with a part of the annular portion of the cable anchor to prevent excess motion of the cable anchor.

3. The sensor as defined in claim 1 wherein the sensor housing includes a low friction surface that extends about opposite sides of the annular portion of the cable anchor to reduce friction between the cable anchor and the housing parts.

4. The sensor as defined in claim 1 wherein the magnet is supported by a magnet retainer or housing and wherein the magnetic retainer is snapped onto the annular portion of the cable retainer.

5. The sensor as defined in claim 4 wherein the magnet retainer is located on a remote end of the annular portion of the cable anchor and includes wings extending outwardly from opposite sides of the annular portion to provide a low friction surface between the cable anchor and the housing parts.

* * * * *